June 21, 1932. O. M. TUCKER ET AL 1,864,275
METHOD AND APPARATUS FOR SEPARATING QUANTITIES OF MOLTEN GLASS FROM MASS
Original Filed Sept. 16, 1916  8 Sheets-Sheet 1
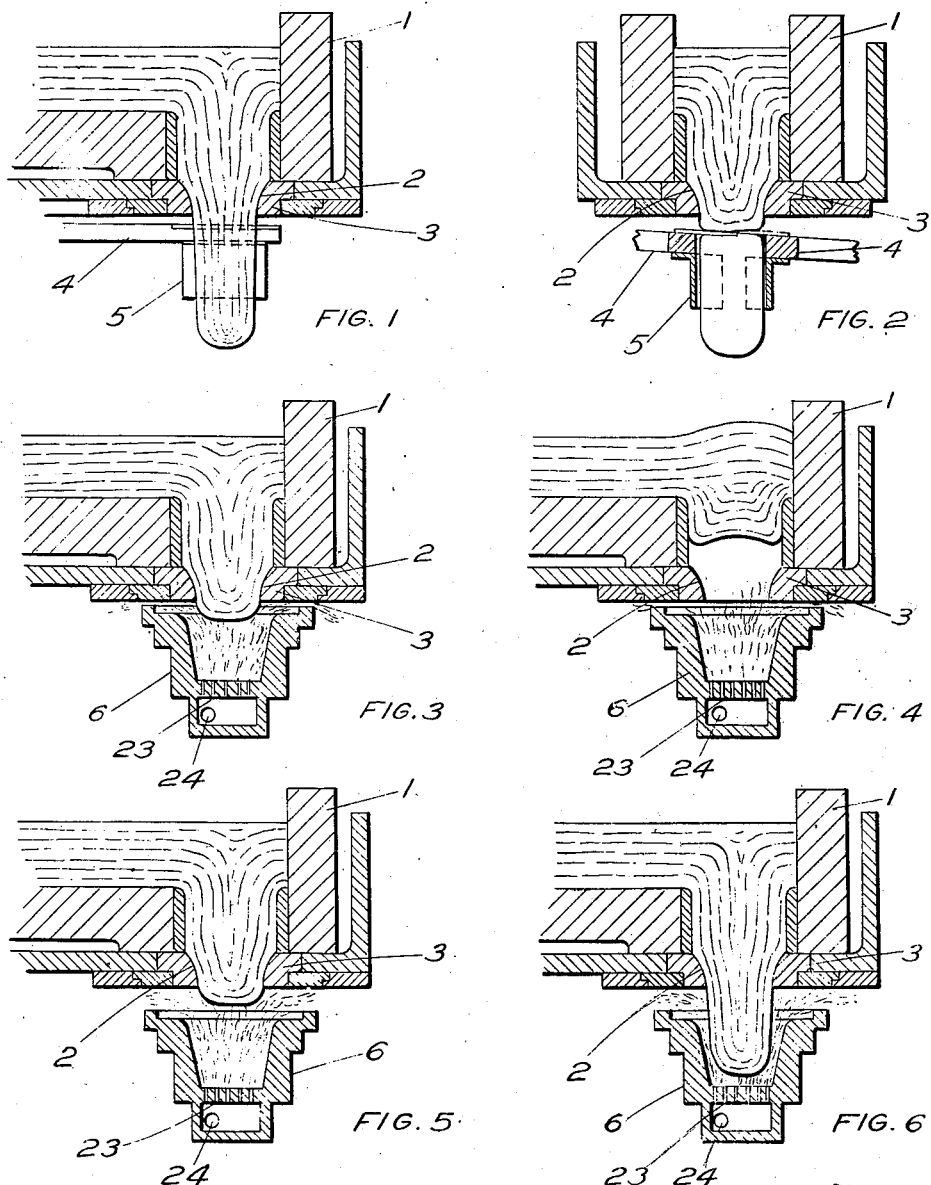
Inventors
Oliver M. Tucker
William A. Reeves
Attorney

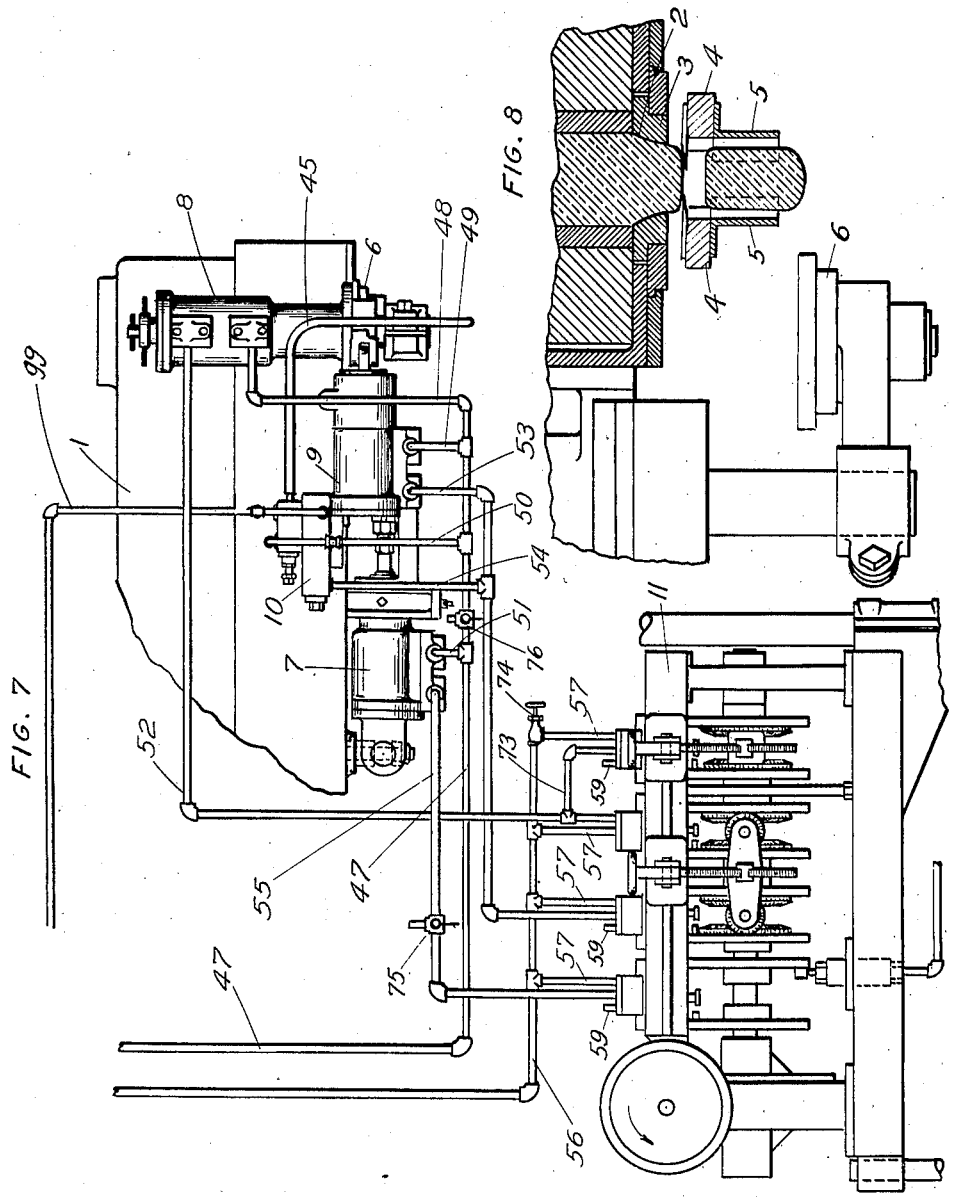

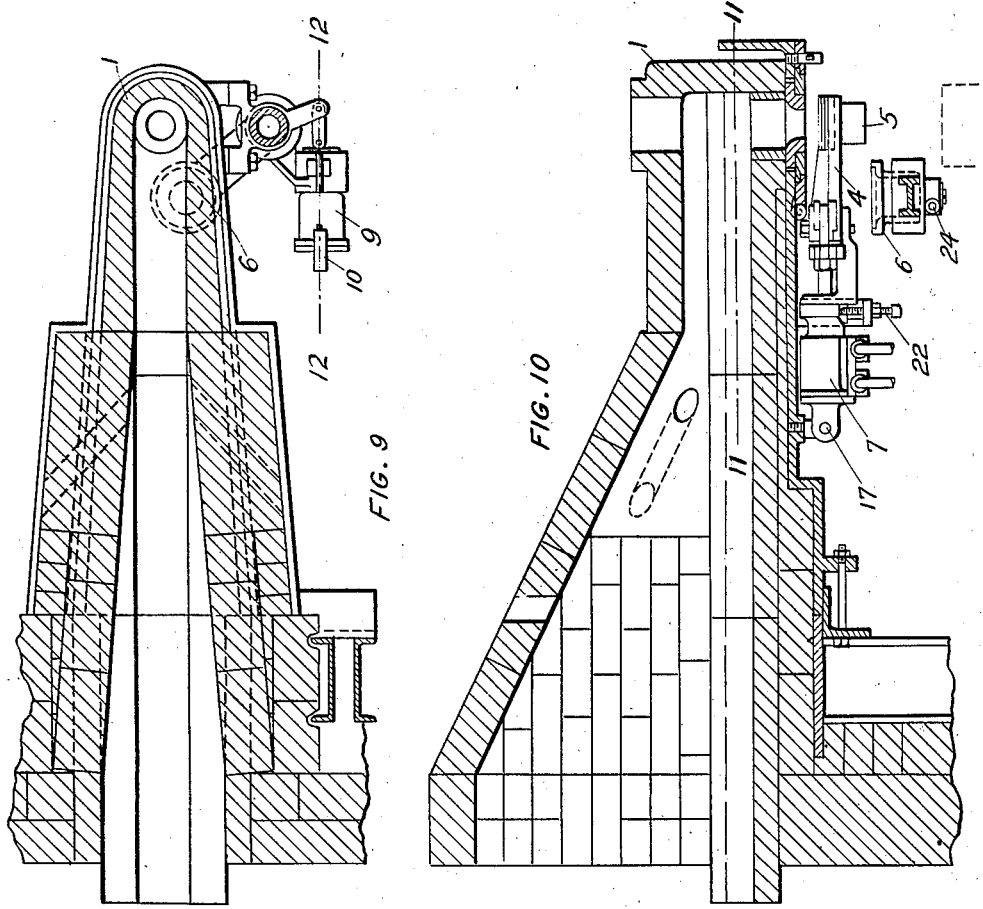

June 21, 1932. O. M. TUCKER ET AL 1,864,275
METHOD AND APPARATUS FOR SEPARATING QUANTITIES OF MOLTEN GLASS FROM MASS
Original Filed Sept. 16, 1916 8 Sheets-Sheet 4
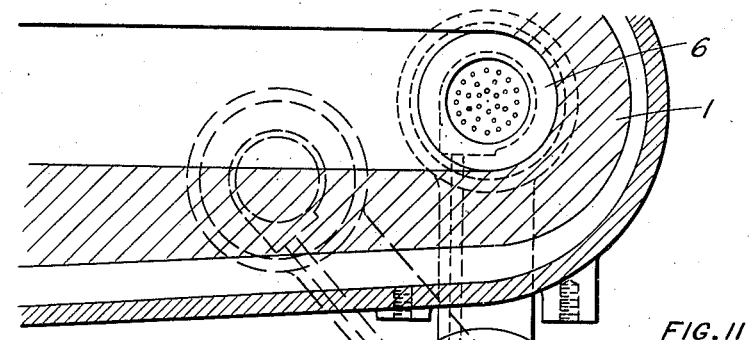
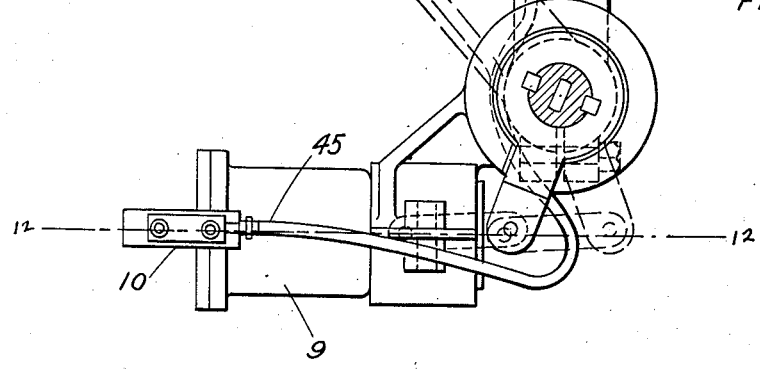
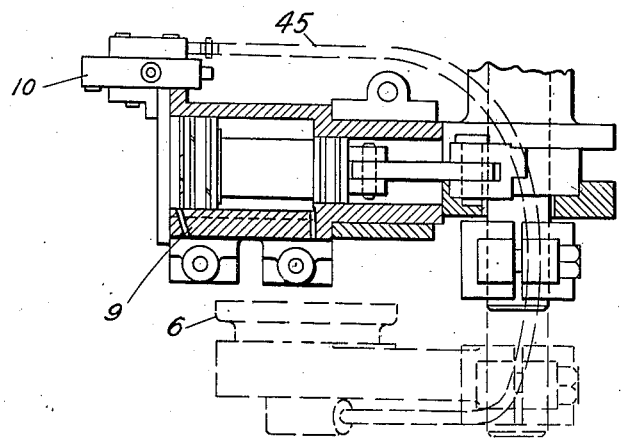
Oliver M. Tucker INVENTORS
William A. Reeves
BY
ATTORNEYS.

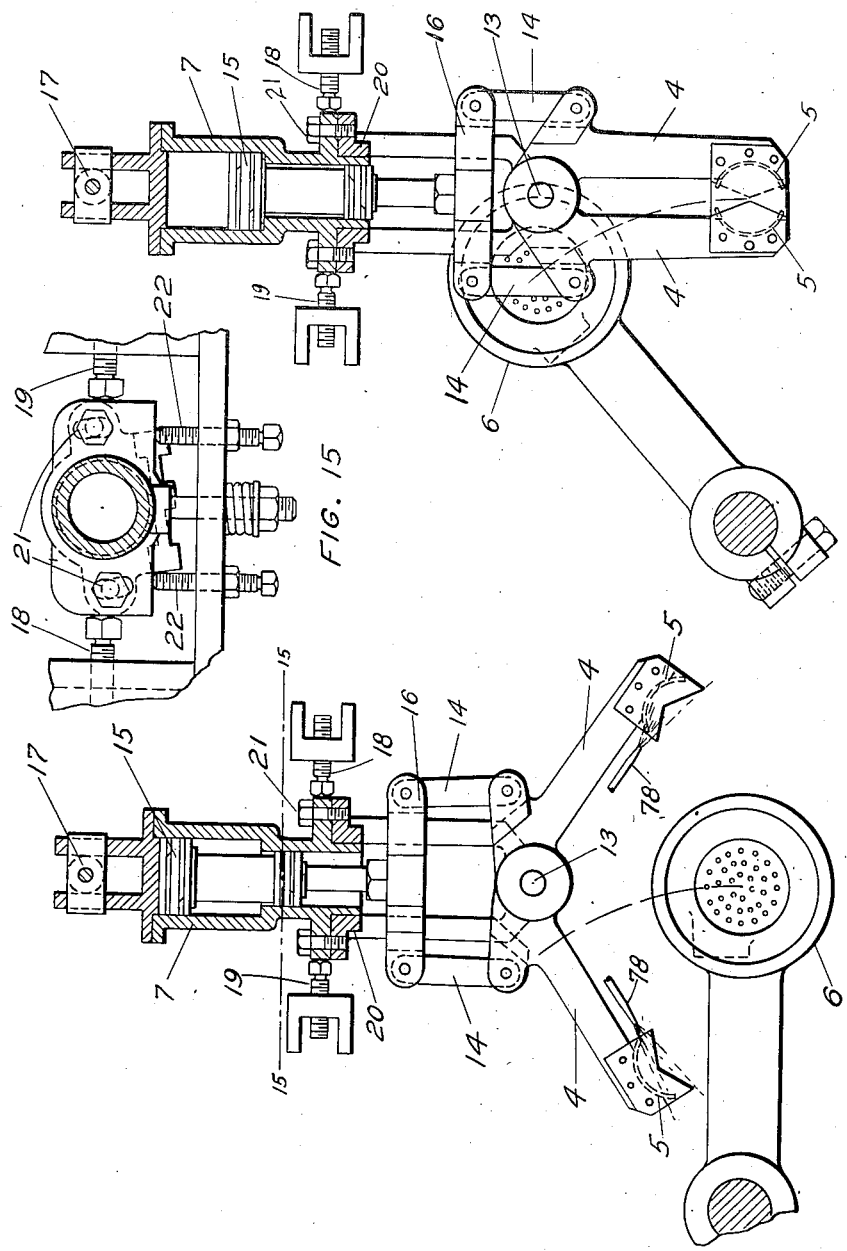

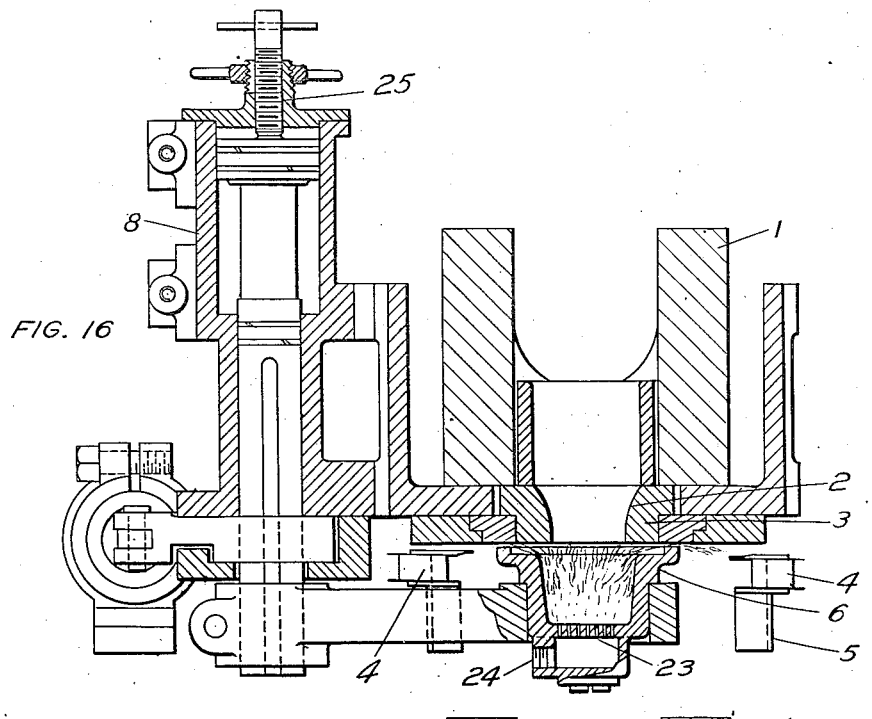
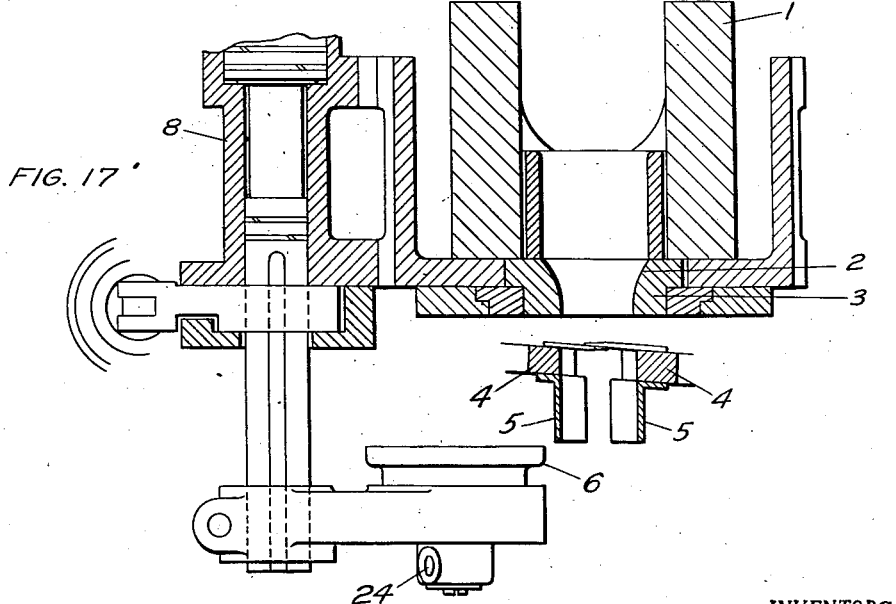

June 21, 1932.   O. M. TUCKER ET AL   1,864,275
METHOD AND APPARATUS FOR SEPARATING QUANTITIES OF MOLTEN GLASS FROM MASS
Original Filed Sept. 16, 1916   8 Sheets-Sheet 7
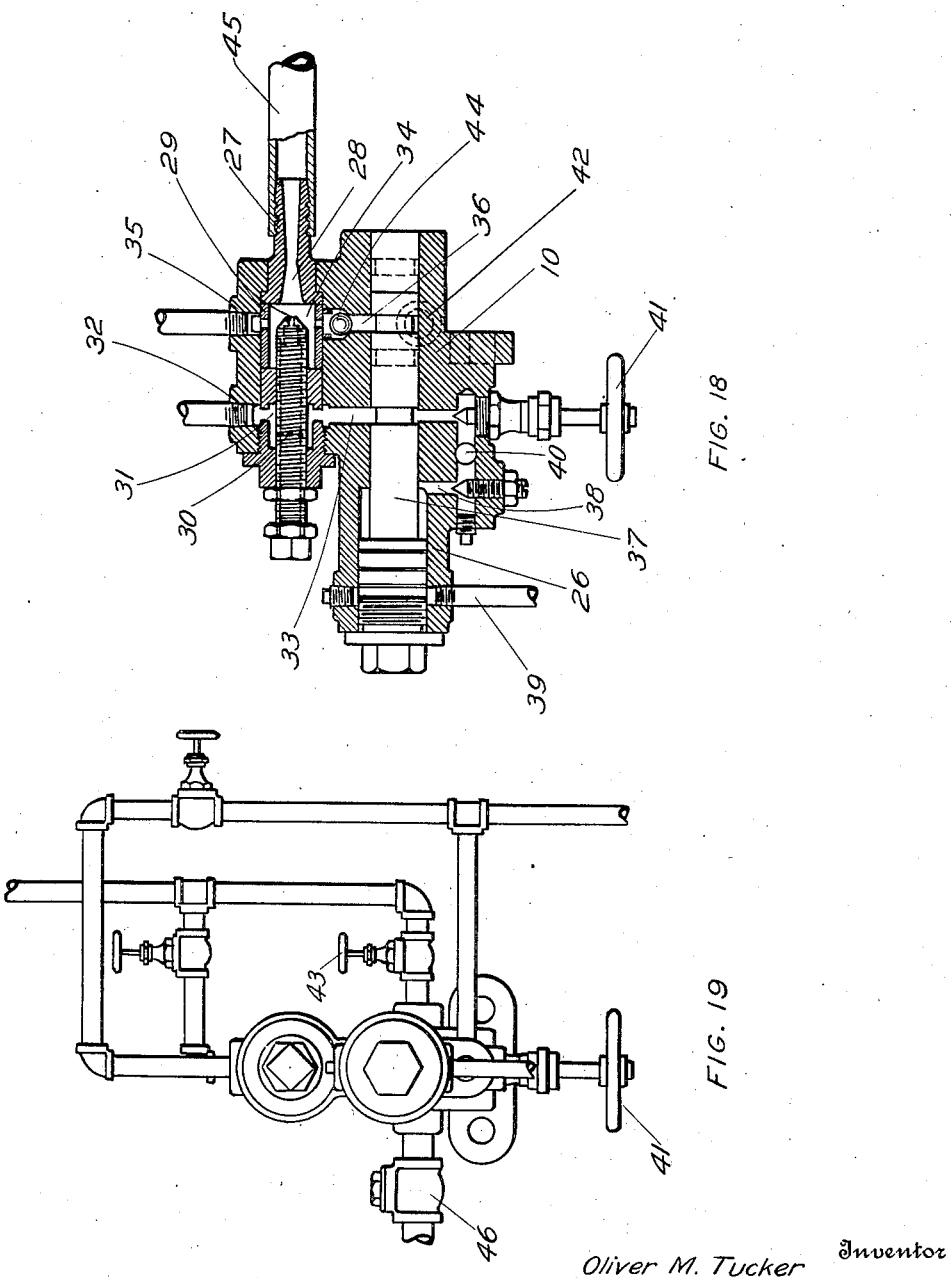
Oliver M. Tucker
William A. Reeves
Inventor
Attorney

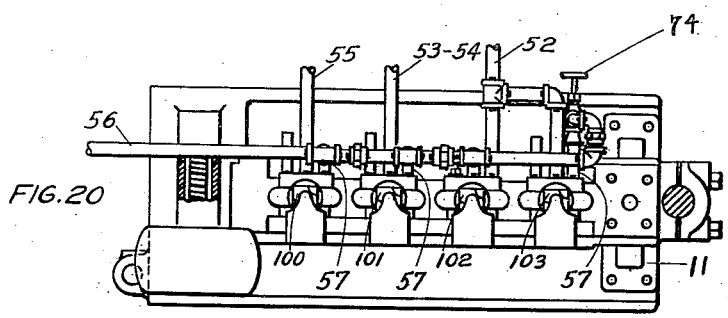
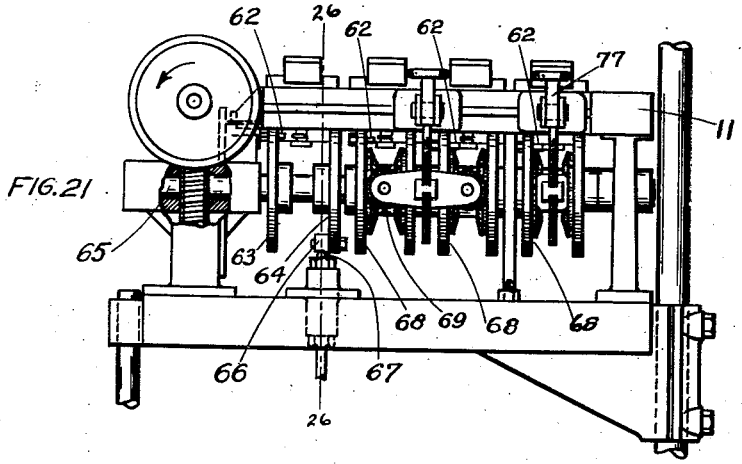
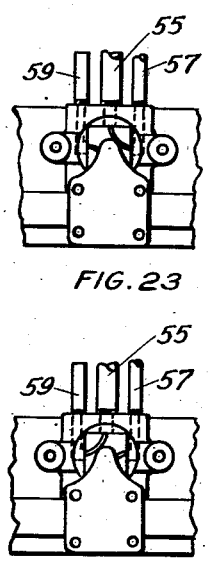
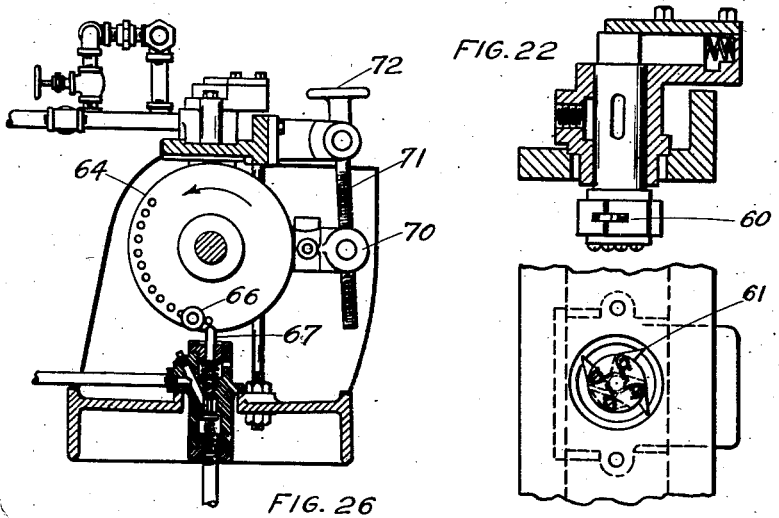

Patented June 21, 1932

1,864,275

UNITED STATES PATENT OFFICE

OLIVER M. TUCKER AND WILLIAM A. REEVES, OF COLUMBUS, OHIO, ASSIGNORS, BY MESNE ASSIGNMENTS, TO HARTFORD-EMPIRE COMPANY, OF HARTFORD, CONNECTICUT, A CORPORATION OF DELAWARE

METHOD AND APPARATUS FOR SEPARATING QUANTITIES OF MOLTEN GLASS FROM MASS

Application filed September 16, 1916, Serial No. 120,429. Renewed January 8, 1931.

Our invention relates to method and apparatus for separating quantities of molten glass from mass and has to do with the separation of batches of glass from a molten mass and the delivery of such batches for treatment in compact form free from laps, folds or blisters. The nature of glass is such that very slight marks or defects in the batch or gob of glass delivered for treatment frequently remain and appear in the article produced therefrom.

This application is a companion to and a continuation in part of our application filed October 24, 1913, Serial No. 797,067, Glass working machines, and our application filed April 10, 1916, Serial No. 90,099, Method of separating quantities of molten glass from mass.

There are three methods generally used today in the separation of quantities of molten glass from mass for the making of glass articles. These are the gathering of glass by hand on the end of a punty, the gathering of glass by suction, and the gathering of glass by flowing it into a mold or other receptacle wherein it is to be finally treated. The first method has hitherto produced the best grade of finished article. The second method leaves a defect and weakness in the finished article. The third method is being rather widely used, although it is particularly defective in that the very flowing of the glass into a mold or other receptacle inevitably involves a coiling or lapping action of the glass stream wherein the exterior chilled skin of the superimposed coils never merges completely enough to avoid subsequent marks and blisters in the article made from the gathered quantity.

Our invention is a radical departure from any of these methods. It does not flow glass into a mold or other receptacle. Therefore, there is no coiling in the receptacle. It is more closely related to the gathering of glass by hand in that it separates and delivers a compact lump or gob of glass. It is even superior to the hand method because the gob delivered is mechanically measured, is gathered by an extruding action rather than by the spinning action of a punty, and is free from "tails" such as are formed on the handmade gather at the time of severance from the punty, being at the same time more uniform in size, shape and weight.

The apparatus described in this application comprises means of special form for delivering charges of viscous glass in compact form, which charges are not only measured as to weight but are definitely shaped with relation to the internal shape of the mold to which they are to be delivered. This apparatus is such that the shaping may be effective in the very process of separating each charge from mass. The process is one of extrusion and it has been found desirable to provide differently sized and probably differently shaped apertures for different grades of ware. A very important feature of the apparatus is that it is so constructed that it may feed to regularly operable severing means and yet accomplish this feeding by an independent emission of viscous glass for each severing operation. The period of emission is variable without varying the frequency of severing operations. Putting it another way, an emission of glass may be started at any given instant prior to a severing operation, and this without altering the regularity of these severing operations. The delivery aperture is unobstructed and is used to determine the cross-section of the charge, that is, the breadth, thickness and shape. The period of extrusion is used to govern the length and therefore to mold both the weight and the shape. A means is provided for re-shaping the glass column after the charge has been severed and for replacing the lower end of the glass column, if necessary, at the same starting point. Where hitherto attempts to gather glass by machinery have been directed to getting the proper weight, with the possible exception of a few abortive attempts to affect the shape of the charge during delivery, this apparatus not only controls the weight but may vary any dimension of the charge at will.

We shall attempt to explain our method in connection with a series of more or less diagrammatic figures, numbered 1, 2, 3, 4, 5 and 6. Then, we shall proceed to a description of the remaining figures of the appended drawings wherein our preferred type of apparatus is shown. Similar characters of reference will be used to designate corresponding parts throughout the drawings, wherein Figure 1 is a longitudinal vertical section taken through the spout preferably used by us in connection with the glass tank, this figure showing the delivery aperture and the manner in which the glass is extruded therefrom.

Figure 2 is a vertical transverse section through the spout and the aperture thereof and illustrating the peculiar tilting of the cutting knives which has a distinct purpose.

Figure 3 is a vertical longitudinal section illustrating the position of the combustion cup which, in our preferred method is moved into the position shown immediately after each cutting action. In this figure, it is apparent that the position of the cup and the pressure therein are such that the glass in the aperture is being held practically stationary.

Figure 4 is a vertical longitudinal section showing another operation of our combustion cup wherein the glass within the aperture is being forced up a considerable distance into such aperture, with certain advantages to be pointed out hereafter.

Figure 5 is a vertical longitudinal section illustrating the manner in which the glass may be permitted to extrude while being heated and protected by an intense flame of a burning mixture of air and gas under pressure.

Figure 6 is a vertical longitudinal section showing a way in which our combustion cup may be used to permit and yet retard the advancing action of the extruding glass with a resultant effect upon its form.

Figure 7 is an assembly view of our apparatus.

Figure 8 is a detail looking from the right of Figure 7 and partially broken away, showing the discharge aperture and the cutting knives.

Figure 9 is a horizontal longitudinal section of the spout shown in Figure 7 with the top removed.

Figure 10 is a vertical longitudinal section illustrating the structure in Figure 9.

Figure 11 is a horizontal longitudinal section taken on line 11—11 of Figure 10 illustrating the operative and inoperative positions of our combustion cup.

Figure 12 is a section taken on line 12—12 of Figure 9 and Figure 11.

Figure 13 is a detail in plan of the knife and cup structure, showing the knives separated and the cup in operative position therebetween.

Figure 14 is a detail in plan of the structure shown in Figure 13, but showing the knives in operative position and the cup in inoperative position.

Figure 15 is a section taken on line 15—15 of Figure 13.

Figure 16 is a detail in vertical section illustrating the knives separated and the combustion cup in operative position to the spout aperture.

Figure 17 is a detail in vertical section showing the knives in operative position and the cup in inoperative position.

Figure 18 is a vertical longitudinal section of a special type of injector very important in the practice of our invention.

Figure 19 is a rear elevation of this injector.

Figure 20 is a plan view of the mechanism for controlling the operation of the various parts of our apparatus through the medium of air pressure, valves and automatically effective and adjustable mechanism being shown.

Figure 21 is a side elevation of the structure shown in Figure 20.

Figure 22 is a vertical section of one of the valves illustrated in Figures 20 and 21.

Figure 23 is an enlarged detail in plan of one of these valves, showing it in position to receive and deliver compressed air to its cylinder.

Figure 24 is a view similar to Figure 23, only showing the valve in position to exhaust air from its cylinder to the atmosphere.

Figure 25 is a bottom plan view of the structure shown in Figure 22 showing the peculiar type of star wheels which are operated to rotate the valves by a step-by-step action by means of the mechanism illustrated in Figures 20 and 21.

Figure 26 is a section taken on line 26—26 of Figure 21 showing the special adjustable mechanism for tripping a valve to synchronize the starting of the press with the various operations of our apparatus.

Referring to Figures 1 to 6 inclusive, it will appear that the glass enters the spout 1 from a tank, not shown, and is delivered from this spout through an aperture 2 in a bushing 3. It is very important that this aperture be of such size in relation to the ultimate size of the gob or lump to be delivered and used and in relation to the method of use that a gob or lump may be separated from the molten mass and delivered for treatment without folds or laps. Where the batch is to be delivered into a mold of considerable diameter, the aperture should be of considerable diameter so that a sufficient quantity of glass can be delivered as a single compact entity that will not fold over or coil in any way. Where the batch or lump is to be delivered to a mold of comparatively slight diameter, it is important that the size of the aperture be sufficiently small to permit of its dropping a batch or lump into the mold without such batch or lump being marked or folded by the edges of the mold orifice, or marred by sticking to the mold walls. With a mold of this type, it is obvious that a batch or lump of less diameter may be delivered and, even though this batch or lump is somewhat elongated, the walls of the mold may prevent folding or lapping.

Therefore, this method contemplates a consideration of the receptacle to which the lump of glass is to be delivered for treatment and the provision of a feed aperture of such a relative size that this lump of glass can be delivered without lapping or folding. The size of this aperture is comparatively permament for we do not vary its size for regulating the weight of the articles where these articles are within a reasonable range of size and weight. Our custom is to select a bushing suitable for a certain class of ware to be made and use this bushing throughout the making of this class of ware, only changing when a change in the size, shape or weight of ware being made makes necessary a bushing with a different size aperture. From this it will appear that we have provided an aperture of a sufficient size to render possible the attainment of the desired weight before the extrusion of glass becomes so long that it will coil or fold in the course of deposit. There may be several methods and various types of apparatus for getting results within the principles of our invention but, regardless of which of these methods or apparatus is used, an important step of our method consists in severing a compact entity of such form that it will reach and settle in its receptacle without folding or lapping. In the particular type of apparatus illustrated, the aperture must be of a sufficient size in relation to the size and shape of the receptacle to permit the extrusion and severance of a lump of glass of proper weight and of such shape that it will not fold or lap.

Our method further consists in so handling the lump of glass both before and after severance from its mass that it will contain no marks that will not disappear from its own heat and that there will be no laps, coils or folds, which result in strains that weaken the ware.

It appears that the apparatus best suited to the performance of our method contemplates the provision of a molten glass container with a feed aperture below the normal level of the glass whereby the uncovering of this aperture will result in the extrusion of a portion of the molten glass. It further appears that the ideal way to accomplish this is by having the feed aperture in the base of a spout or tank immediately above the point of desired deposit. Then, the uncovering of the aperture automatically results in the extrusion of a more or less cylindrical and gradually increasing mass as illustrated, for example, in Figs. 1 to 6 of the drawings. Without delay, the outer surface of this mass becomes comparatively chilled and, in effect, becomes a skin which is being constantly stretched by the comparatively hot glass feeding into the center thereof. Probably this skin is being gradually added to by the extruding glass. The size of the mold or the nature of the surface to which this batch is to be delivered must be taken into consideration. Then, the extruded portion must be severed while it is in such shape that, when deposited, it will settle without folding or lapping.

Attention is called to the knife arms 4 and particularly to the fact that the knives are tilted from the horizontal. There is a distinct purpose in this; for one knife is necessarily in a different horizontal plane from the other and this tends to result in a partial overturning of the batch at the instant of severance. It is desirable that the lump be dropped straight in the mold for this insures a proper settling of the lump. The tilting of the knives in the manner shown tends to counteract this tendency to overturn and a further counteractive agency is the deflectors 5 depending from the lower surfaces of the knife arms.

The apparatus preferably used by us is shown assembled in Figures 7 and 8 and comprises a spout 1 connected to a tank (not shown) and having an aperture 2 in a bushing 3.

The bushing 3 is of a peculiar type having important advantages and is also mounted in a novel manner. In the first place, it is made in two parts, and the upper part is permanently positioned while the lower part is secured upon a hinged ring (see Figure 10) and is removable therefrom so that similar parts of varying size may be applied. Thus there is provided an enlarged chamber immediately above the delivery orifice of the bushing and yet the walls of this delivery orifice are tapered. The result is that a comparatively large volume of molten glass is fed to the point where this delivery orifice commences and then the central portion of this volume is discharged through this comparatively short and tapered orifice. The result is that friction against the walls of the bushing is practically eliminated for the glass which is actually delivered is taken from the center of a stream of larger diameter and extruded through an orifice of minimum depth. The formation of the bushing in two parts and the mounting of this bushing on a hinged ring also facilitates changing of the bushing, since the hinged ring may be swung down and a new bushing placed thereon with little difficulty and at a point comparatively remote from the hot glass.

Working immediately below the spout and preferably carried thereby is a pair of knife arms 4 carrying deflectors 5. These knives are designed to be successively brought together and separated and they have various adjustments, to be described. They are mounted to have a practically instantaneous cut and this is particularly important when the diameter of the extruding glass is considered. Mounted and controlled for operation while the knives are inoperative is a combustion cup 6 which is automatically effective for a predetermined period of time after each cutting action, this period of time being variable at will by the adjustment of timing mechanism to be described. The knives are controlled by a piston and cylinder mechanism designated 7. The combustion cup is given vertical movement by the vertical piston and cylinder construction 8 and is given horizontal movement by the horizontal piston and cylinder construction 9. The combustion cup is fed with a combustible mixture by an injector 10 and the effect of the compressed air used for the different cylinders and for the injector is controlled by a timing mechanism 11.

The knife structure is illustrated best in Figures 8, 13, 14 and 15 and comprises blades carried upon arms 4 which are pivoted at 13 and which are provided with perforated ears to which are attached operating links 14 connected by a cross piece 16 mounted upon a piston stem. This piston stem carries piston 15 operable by air. The manner of bringing together and separating these knives by the use of air pressure will be made apparent by a general description of the type of cylinder and piston used throughout this apparatus.

An examination of Figures 13 and 14 will show that the knife is swivelled as at 17 while its opposite end may be swung horizontally under the restraint of set screws 18 and 19. This adjustment is important for several reasons. One reason is that it is desirable that the severed portion fall and alight upon its base as well as in a centered position upon its treating surface. A slight adjustment of these knives sidewise will tend to ensure this result if the fall has hitherto been defective. This adjustment has an increased effectiveness because of the deflectors 5.

In the section taken on line 15—15, it appears that the support 20 for the knives per se has bolt and slot connections at 21 whereby the knives may be bodily tilted from the horizontal. This is a very desirable construction. The cutting blades are necessarily in different horizontal planes. The result is, that there is a tendency to bat the glass sidewise and that the severance of the glass produces an uneven cut upon the batch which is then deposited but particularly upon the lower end of that portion of the glass which is still connected to the mass. The disposition of these knives in tilted position has several results. In the first place, it neutralizes this tendency of the knives to bat the glass sidewise. In the second place, it reduces the irregularity of the cut surface of the glass still appended to the mass.

A vertical adjustment of the free end of this knife structure may be effected by one or more set screws 22. There are many important advantages to this adjustment chiefly relating to the maintenance of proper form for the extruding glass under different conditions such as varying viscosities et cetera.

The combustion cup is best illustrated in Figures 3 to 6, 16 and 17 and has been designated 6. It comprises a cup with a perforated false bottom 23 and with an inlet 24 in the chamber beneath the false bottom for the introduction of the combustible mixture thereto. This inlet is preferably tangentially disposed so that the gaseous mixture delivered to the chamber beneath the false bottom has a swirling action in its delivery to the perforations of this false bottom. The cup is desirably controlled by air under pressure and is capable of various movements. After each operation of the cutting knives, this cup swings into position beneath the feed aperture of the spout and then moves upwardly into desired relation to the glass in or depending from the spout.

The combustion cup is connected to a source of supply of a fluid under pressure, preferably a combustible mixture in such a manner that a certain quantity of the mixture is always being fed thereto. Thus, the cup always contains a flame, although in the periods of inaction this flame is simply in the nature of a pilot light. The controlling apparatus is such that, in synchronism with the movement of the combustion cup into operative position, a great increase in the combustible mixture fed thereto takes place. Furthermore, the mixture fed during the period of action is fed under a maintained pressure. It is very important that this be done and we have accomplished it by the use of a novel and peculiar form of injector, to be described. The position of the combustion cup is regulable by the adjustable stop 25 in the top of the vertical cylinder 8 and the pressure of the mixture within the cup is also regulable. The actions of both the cup and the pressure therein may be varied to attain unusual results. This variability or regulability of the cup and of the pressure therein may be effected independently or together. In other words, the position of the cup may be varied to vary the pressure upon the glass, the pressure of the mixture may be varied to vary the pressure upon the glass, or both the position of the cup and the pressure of the mixture may be varied to attain this result. The variations in the position of the cup must necessarily be within a very slight range if combustion and pressure are to be maintained. Nevertheless, the cup is variable within this range and these variations are extremely important in the effect produced upon the glass.

One method of using the combustion cup is to swing it into such a position and with the mixture at such a pressure that the glass extruding from the feed aperture of the spout is balanced and halted in its movement (see Figure 3). Another method is to swing it into such a position and with the mixture at such a pressure that the normal movement of the molten glass in the spout is reversed and this glass driven up into the spout (see Figure 4). A third method is to swing the combustion cup into position below the aperture and then cause the cup to recede as the glass advances, with the flame of the cup playing upon this glass (see Figure 5). A fourth method is to hold the combustion cup in position until the free end of the extruding glass almost touches the base of the cup and then to gradually lower the cup, retarding the extrusion of the glass and in some measure influencing its form by the impact of the blast (see Figure 6). In all of these forms, the glass is being subjected to an extremely intense heat with the result that such marks as were made by the shears are entirely removed and detrimental chilling of the extruding glass is obviated. It is obvious that this combustion cup in operation under the control of its operating and the timing mechanism not only times the movement of the extruding glass so as to properly time its delivery to the approaching mold but it performs a more vital function, since it is this rate of movement of the glass and the time it is in motion that determines the weight of the batch or gob of glass to be delivered, as long as the regularity of action of the cutting knives and the size of the aperture is unchanged. Special attention is directed to this fact that we, by using a feed aperture of sufficient and unvarying size for ware of a given range of weight and size, are enabled to secure a compact batch or gob of glass whose weight is regulated by the rate of extrusion of the glass in relation to the time between successive cutting actions.

Very peculiar results are attained from the different uses of this combustion cup. For instance, when the cup is used as indicated in Figure 4 and the glass is comparatively fluid it is forced up into the spout with the result that during its return it extrudes a batch of greater diameter than it would otherwise have and with less tendency to string out in the early stages of extrusion. This is extremely desirable in varying the from of the path or gob to be severed. On the other hand, there are certain conditions, as when the glass is more viscous, when it is more desirable to simply counterbalance the glass as in Figure 3. It is difficult to enumerate all of the possible variations in the use of this combustion cup but experience has demonstrated that it is effective to meet practically all the varying conditions to be met with in the separation automatically of batches of glass from a molten mass.

The injector is shown in Figures 18 and 19 as comprising a casing 26 having a discharge pipe 27 and a Venturi tube 28 contained therein. Disposed directly in front of the inlet of this tube is a jet 29 having a port 30 therein in communication with a chamber 31. This chamber 31 is designed to be fed with air under pressure through a pipe tap 32 when the combustion cup is in stationary inoperative position and through a port 33 from the moment this cup starts to move toward operative position until it returns to its stationary inoperative position. Likewise, the discharge orifice of the jet 29 is disposed in a chamber 34 and this chamber 34 is fed with gas, due to the velocity of the air through the Venturi tube, producing a suction through the pipe tap 35 when the cup is in stationary inoperative position and through the port 36 from the moment the cup starts to move toward operative position until it returns to stationary inoperative position. The ports 33 and 36 are controlled by the piston valve 37 which is movable to open position by the introduction of air through port 38 and is movable to inoperative position by the introduction of air through port 39. The air supply port is indicated at 40 and it will appear that its communication with the port 33 is governed by valve 41. The gas supply port is indicated at 42 and is likewise under the control of a valve 43. The gas port 36 may be provided with a check valve 44 which opens under suction produced by the passage of compressed air from the jet 29 through the Venturi tube but which automatically closes in the event that this air passage through the said tube is choked off.

A feature of vital importance in our improvement has to do with an auxiliary check valve made a part of this injector. It is obvious that the air and gas mixture is forced into the combustion cup from the outlet 27 through a flexible pipe 45 under pressure even when the cup is in stationary position. At or about the instant the cup starts to move towards operative position, the piston valve of the injector is operated by mechanism provided for greatly increasing this pressure. It is obvious, however, that the volume of gas is determined in some measure by the vacuum caused by the air jetted through the Venturi tube. It is likewise obvious that this vacuum will vary in degrees dependent primarily upon the degree of outlet from the combustion cup. It is necessary to success of the highest kind that a substantially uniform combustion be maintained in the cup regardless of the variations in the outlet from such cup. Variations in the air pressure may not be so vital but the gas drawn in must be substantially uniform in volume. This variation of condition is due primarily to the different positions at which the cup operates and it may be due to other things. Whatever the causes are, however, we have found it extremely important to success that some means be provided to maintain a substantially uniform vacuum so that there will be substantially uniform volume of gas forced into the combustion cup with the air.

Our apparatus for accomplishing this result has taken the form of a check valve 46 which is definitely weighted and covers an opening of a definite size so that any increase of the vacuum in the chamber 34 above a predetermined degree will raise this check valve and draw in sufficient air to reduce the vacuum. The injector is constructed capable of creating a vacuum higher than is desirable and this auxiliary valve is used to set a limit to the degree of vacuum actually used and consequently to insure a uniform volume of gas being forced into the combustion cup.

The cylinders and pistons used in our invention are of the type illustrated in our application Serial Number 797,067, filed October 24, 1913. The peculiarity in construction appears in Figures 12, 13, 14, 16 and 17. It arises from the fact that air is admissible to both sides of a piston-head and that one side of this piston-head is of greater area than the other side. Constant pressure air is maintained against that side of the piston-head having the smallest exposed area. This maintains the piston in normal position. Then the pistons are operated by the automatic introduction of air pressure to the sides of the pistons, which have the largest area under control of the timing mechanism to be described.

The piping for conducting the air under pressure to the cylinder and the injector is illustrated best in Figure 7 of the drawings.

Referring to Figure 7 of the drawings, the constant pressure air is supplied through main pipe 47. It is directed to the cylinder whose piston moves the combustion cup vertically by branch pipe 48, to the cylinder whose piston moves the combustion cup horizontally by branch pipe 49 to the chamber for the injector valve by branch pipe 50, and to the cylinder whose piston operates the cutting knives by branch pipe 51. The positive actuation of the piston for causing the lowering of the combustion cup is effected by the introduction of air through the pipe 52; the positive operation of the piston for swinging the cup horizontally into operative position is effected by the introduction of air through the pipe 53; the movement of the valve of the injector into operative position is effected by the introduction of air through the pipe 54; and the knives are brought together by introducing air through the pipe 55. The gas supply pipe is indicated at 99.

The timing mechanism for controlling the valves which admit air to the pipes 52, 53, 54 and 55 is illustrated in Figures 7 and 20 to 25. In these figures it will be noted that the air is fed from left to right through the piping 56 and thence through branch pipes 57 by rotary valves. Each rotary valve has two arcuate ports so that its movement in successive quarter-turns successively connects a branch 57 with a pipe 55 that delivers to a cylinder and then connects the latter with an exhaust 59 (see Figures 23 and 24 for successive positions of a valve).

These rotary valves carry upon their bases star wheels 60 with points 61 yieldable one way, whereby such valves may be given quarter-turns successively by pins which may be collectively designated 62 carried upon a series of disks. The operations of these disks vary to some extent as follows.

The knife operating disk may be designated 63. It is rigidly mounted upon the driven shaft 65 and carries a couple of pins 62. The first pin which is presented to operate the star wheel by rotation is preferably immovably mounted. The second pin is desirably capable of adjustment by positioning in any one of a series of apertures arranged adjacent the periphery of the disk in a manner similar to the showing in Figure 26. The operation of these pins upon the star wheel of the valve is very rapid. The first pin gives the star wheel and its valve a quarter-turn and thus brings it into position to admit operating air to the cylinder 7 which results in bringing the knife arms together to sever the glass. Immediately, the other pin gives the star wheel and its valve another quarter-turn and brings it into position to exhaust air from the cylinder 7 with the result that the knife arms are separated. The complete action of the knife arms is practically instantaneous and this is extremely desirable in view of the volumes of glass being severed and the intense heat which is otherwise liable to injure the knife blades.

The disk 64 is shown in detail in Figure 26 and is a rigidly mounted disk utilized to trip the valve which sets in motion the press to be disposed beneath and fed by our apparatus. This disk is shown as comprising a series of openings or sockets adjacent its periphery for the adjustable reception of a tripping lug 66. This tripping lug 66 automatically trips a valve 67 which sets the press in operation. Thus the starting of the press may be timed with the various operations of our apparatus. Timing mechanisms for controlling various operations of our apparatus are disclosed and claimed in our co-pending applications, Serial No. 392,916, filed June 30, 1920, and Serial No. 750,065, filed Nov. 15, 1924.

The remaining disks 68 are arranged in pairs, the second from the left of each pair being loosely mounted upon the shaft 65 while the other is rigidly mounted thereon. Each disk carries an inwardly extending pin 62 and the two pins of each pair are mounted to successively actuate one valve through the medium of its star wheel. The period between these actuations is determined by the time in which one pin of a pair follows after the other to actuate the star wheel. It is for this reason that one disk of each pair is loosely mounted, as it is adjustable in relation to the rigidly mounted disks by the intermeshing of gears mounted upon each disk and a beveled pinion 69. This adjustment is effected by the raising or lowering of the arm 70 by means of the screw rod 71 having a handle 72. An examination of Figure 21 will make it apparent that the disks and their pins which operate the valves 101 and 102 are adjustable under the control of a single operating screw 71. The first pair of these disks controls the inlet of operating air to the injector and horizontal cylinder simultaneously. The second pair of these disks controls the rapid up and and down movement of the piston in the vertical cylinder 8. It is extremely desirable that all of these elements have their adjustments effected with relation to each other and the mechanism described insures that this will be done. The raising of the member 70 results in lessening the weight of the glass in the severed batch or lump while the lowering of this member results in increasing this weight. The last pair of disks in Figure 21 are designed to operate the valve 103 so as to govern and produce a slow receding action of the combustion cup after it has once assumed operative position. The period of time of this receding action can be regulated by screw rod 77 in a manner similar to the regulation by the screw rod 71.

It has been made apparent that valve 100 automatically controls the introduction and the exhaust of operating air to and from the knife cylinder. It has further been made apparent that valve 101 automatically controls the introduction of operating air to and its exhaust from the valve of the injector and the horizontal cylinder which moves the combustion cup horizontally. It has been explained that the increase of feed of the combustible mixture to the combustion cup and the initiation of the horizontal movement takes place simultaneously.

Valves 102 and 103 are designed to cooperate, under certain conditions, in the control of the vertical movement of the combustion cup. This cup is designed to be automatically raised by the constant pressure air when it has been moved into proper position beneath the spout aperture. It is also moved horizontally to this proper position by the constant pressure air. When it is desired to move the combustion cup vertically downward with considerable rapidity, the timing mechanism is so set that the valve 102 will be automatically operated to introduce operating air to the vertical cylinder controlling this combustion cup. After this has happened, the timing mechanism will operate the valve 101 to introduce operating air to the horizontal cylinder and thus move the combustion cup horizontally to stationary inoperative position.

It may be desired to lower the cup slowly with the glass in the position shown in Figure 6. If this is done, the final movement of the cup must be rapid so as to clear the glass before the horizontal movement of the cup takes place. We accomplish this by providing for a cooperative relation between the valve 102 and 103. A branch pipe 73 leads from the valve 103 to the pipe 52. The introduction of air to the valve 103 may be throttled by a needle valve 74. Then the automatic actuation of the valve 103 will serve to admit operating air to the branch 73 and then by way of the pipe 52 to the vertical cylinder 8 owing to the effect of the valve 74. However, this air will only be sufficient to force the piston of this cylinder 8 downward at a slow speed. At a given point, however, the valve 102 automatically opens to deliver a full charge of air through the pipe 52 to the vertical cylinder 8. There results a rapid lowering of the combustion cup and this is followed, as usual, by operation of the horizontal cylinder to move the cup horizontally to stationary inoperative position. This rapid drop of the combustion cup after its slow recession before the extruding glass is necessary to insure a clearance of the glass before horizontal movement takes place. The knives may be rendered inoperative by operation of the three way valve 75 and the combustion cup may be rendered inoperative by operation of the three way valve 76.

The driven shaft 65 is preferably propelled in the direction indicated by the arrow in Figure 26 by a motor operating through a worm and worm gear as shown in Figures 20 and 21. The knife blades may be cooled by air blasts as at 78.

In operation, the molten glass flows from the tank into the spout to the feed aperture thereof. By the weight of the glass in the spout, a portion of this glass is extruded through the feed aperture and for a predetermined period of time. Then the knives are automatically brought together, serving to sever a portion of the extruded glass and direct its deposit into the treating receptacle in such a manner that it will alight properly. Then, the combustion cup starts to move and simultaneously the pressure of the combustible mixture therein is greatly increased showing a much increased flame. This combustion cup moves horizontally in an arc until it assumes position beneath the feed aperture, the horizontal movement being effected by the horizontal piston and cylinder described. When it is beneath the feed aperture, it automatically moves upwardly until, in normal usage, it nearly abuts the bottom of the spout, embracing the glass in and depending from the feed aperture. The glass in this aperture may be counter-balanced, given a reverse movement, or it may be permitted to have a retarded descent. After a predetermined proper interval, the cup is automatically dropped and swung horizontally out of position. Then after a further predetermined interval, the knives are brought together to sever a portion of the glass that has extruded. This completes the cycle of operation. Attention has already been called to the fact that the timing mechanism for the movements of the knives and the combustion cup also times the starting of the press.

It is important to note that our apparatus provides for interchangeable bushings so that various sizes of bushings may be provided for different ranges in weight, shape and size of the articles being made. At the same time our apparatus is such that adjustment may be effected to vary the weights of gathers made with the same bushing, so that within limits different weights, sizes and shapes of ware may be made with this same bushing.

Having thus described our invention, what we claim is:

1. A machine for separating formed charges of viscous glass from viscous mass, comprising a receptacle for viscous glass having a delivery aperture in its base; means for intermittently uncovering said aperture completely, severing en bloc glass extruding from said aperture, and closing such aperture in continuous succession; and means for changing the duration of the period of uncovering, independently of the frequency of cutting, whereby mold charges of predetermined size and shape may be produced.

2. A machine for separating formed charges of viscous glass from viscous mass, comprising a receptacle for viscous glass having a delivery aperture in its base; means for controlling delivery of the glass comprising a device for intermittently covering and completely uncovering and leaving the aperture entirely unthrottled when uncovered, severing means independent of said last means, and means for varying either the duration of the period of uncovering or the frequency of severing independently of each other, whereby mold charges of predetermined size and shape may be produced.

3. A machine for separating formed charges of viscous glass from viscous mass comprising a receptacle for viscous glass with a delivery aperture of chosen dimensions in its base; means for controlling delivery of the glass comprising a device for stopping extrusion from the aperture with a static pressure flame and then completely uncovering and leaving the aperture entirely unthrottled when uncovered, severing means independent of said last means, and means for varying either the period of uncovering or the frequency of severing independently of each other.

4. A machine for separating formed charges of viscous glass from viscous mass, comprising a receptacle for viscous glass having a delivery aperture in its base, means for intermittently uncovering said aperture completely, severing en bloc glass extruding from said aperture, and closing such aperture in continuous succession, and means for changing the duration of the period of uncovering without varying the frequency of cutting and during the operation of the machine.

5. Glass apparatus comprising a receptacle for molten glass with a feed outlet uncontrolled during feeding, means for successively severing the glass fed, and means for regulatably controlling the length of the feed period between severing operations while the apparatus is in operation without varying the frequency of cutting.

6. In the glass working art, the method of obtaining a succession of mold charges in lump form which comprises superimposing a mass of viscous glass upon an aperture of chosen dimensions, completely uncovering said aperture intermittently and permitting the glass to extrude, severing the glass extruded at each uncovering action, then covering after each severing operation, and varying the period of uncovering or the period between severing actions independently.

7. In the glass working art, the method of obtaining a succession of mold charges in lump form which comprises superimposing a mass of viscous glass upon an aperture of chosen dimensions, completely uncovering said aperture intermittently and permitting the glass to extrude, severing the glass extruded at each uncovering action, then covering after each severing operation, and varying the period of uncovering without varying the interval between cuttings to regulate the charges delivered without varying the rate of production.

8. In the glass working art, the method of obtaining a succession of mold charges in lump form which comprises superimposing a mass of viscous glass upon an aperture of chosen dimensions, completely uncovering said aperture intermittently and permitting the glass to extrude, severing the glass extruded at each uncovering action, then covering after each severing operation, and varying the interval between cuttings without varying the period of uncovering to regulate the rate of production without varying the charges.

The remaining disks 68 are arranged in pairs, the second from the left of each pair being loosely mounted upon the shaft 65 while the other is rigidly mounted thereon. Each disk carries an inwardly extending pin 62 and the two pins of each pair are mounted to successively actuate one valve through the medium of its star wheel. The period between these actuations is determined by the time in which one pin of a pair follows after the other to actuate the star wheel. It is for this reason that one disk of each pair is loosely mounted, as it is adjustable in relation to the rigidly mounted disks by the intermeshing of gears mounted upon each disk and a beveled pinion 69. This adjustment is effected by the raising or lowering of the arm 70 by means of the screw rod 71 having a handle 72. An examination of Figure 21 will make it apparent that the disks and their pins which operate the valves 101 and 102 are adjustable under the control of a single operating screw 71. The first pair of these disks controls the inlet of operating air to the injector and horizontal cylinder simultaneously. The second pair of these disks controls the rapid up and and down movement of the piston in the vertical cylinder 8. It is extremely desirable that all of these elements have their adjustments effected with relation to each other and the mechanism described insures that this will be done. The raising of the member 70 results in lessening the weight of the glass in the severed batch or lump while the lowering of this member results in increasing this weight. The last pair of disks in Figure 21 are designed to operate the valve 103 so as to govern and produce a slow receding action of the combustion cup after it has once assumed operative position. The period of time of this receding action can be regulated by screw rod 77 in a manner similar to the regulation by the screw rod 71.

It has been made apparent that valve 100 automatically controls the introduction and the exhaust of operating air to and from the knife cylinder. It has further been made apparent that valve 101 automatically controls the introduction of operating air to and its exhaust from the valve of the injector and the horizontal cylinder which moves the combustion cup horizontally. It has been explained that the increase of feed of the combustible mixture to the combustion cup and the initiation of the horizontal movement takes place simultaneously.

Valves 102 and 103 are designed to cooperate, under certain conditions, in the control of the vertical movement of the combustion cup. This cup is designed to be automatically raised by the constant pressure air when it has been moved into proper position beneath the spout aperture. It is also moved horizontally to this proper position by the constant pressure air. When it is desired to move the combustion cup vertically downward with considerable rapidity, the timing mechanism is so set that the valve 102 will be automatically operated to introduce operating air to the vertical cylinder controlling this combustion cup. After this has happened, the timing mechanism will operate the valve 101 to introduce operating air to the horizontal cylinder and thus move the combustion cup horizontally to stationary inoperative position.

It may be desired to lower the cup slowly with the glass in the position shown in Figure 6. If this is done, the final movement of the cup must be rapid so as to clear the glass before the horizontal movement of the cup takes place. We accomplish this by providing for a cooperative relation between the valve 102 and 103. A branch pipe 73 leads from the valve 103 to the pipe 52. The introduction of air to the valve 103 may be throttled by a needle valve 74. Then the automatic actuation of the valve 103 will serve to admit operating air to the branch 73 and then by way of the pipe 52 to the vertical cylinder 8 owing to the effect of the valve 74. However, this air will only be sufficient to force the piston of this cylinder 8 downward at a slow speed. At a given point, however, the valve 102 automatically opens to deliver a full charge of air through the pipe 52 to the vertical cylinder 8. There results a rapid lowering of the combustion cup and this is followed, as usual, by operation of the horizontal cylinder to move the cup horizontally to stationary inoperative position. This rapid drop of the combustion cup after its slow recession before the extruding glass is necessary to insure a clearance of the glass before horizontal movement takes place. The knives may be rendered inoperative by operation of the three way valve 75 and the combustion cup may be rendered inoperative by operation of the three way valve 76.

The driven shaft 65 is preferably propelled in the direction indicated by the arrow in Figure 26 by a motor operating through a worm and worm gear as shown in Figures 20 and 21. The knife blades may be cooled by air blasts as at 78.

In operation, the molten glass flows from the tank into the spout to the feed aperture thereof. By the weight of the glass in the spout, a portion of this glass is extruded through the feed aperture and for a predetermined period of time. Then the knives are automatically brought together, serving to sever a portion of the extruded glass and direct its deposit into the treating receptacle in such a manner that it will alight properly. Then, the combustion cup starts to move and simultaneously the pressure of the combustible mixture therein is greatly increased showing a much increased flame. This combustion cup moves horizontally in an arc until it assumes position beneath the feed aperture, the horizontal movement being effected by the horizontal piston and cylinder described. When it is beneath the feed aperture, it automatically moves upwardly until, in normal usage, it nearly abuts the bottom of the spout, embracing the glass in and depending from the feed aperture. The glass in this aperture may be counter-balanced, given a reverse movement, or it may be permitted to have a retarded descent. After a predetermined proper interval, the cup is automatically dropped and swung horizontally out of position. Then after a further predetermined interval, the knives are brought together to sever a portion of the glass that has extruded. This completes the cycle of operation. Attention has already been called to the fact that the timing mechanism for the movements of the knives and the combustion cup also times the starting of the press.

It is important to note that our apparatus provides for interchangeable bushings so that various sizes of bushings may be provided for different ranges in weight, shape and size of the articles being made. At the same time our apparatus is such that adjustment may be effected to vary the weights of gathers made with the same bushing, so that within limits different weights, sizes and shapes of ware may be made with this same bushing.

Having thus described our invention, what we claim is:

1. A machine for separating formed charges of viscous glass from viscous mass, comprising a receptacle for viscous glass having a delivery aperture in its base; means for intermittently uncovering said aperture completely, severing en bloc glass extruding from said aperture, and closing such aperture in continuous succession; and means for changing the duration of the period of uncovering, independently of the frequency of cutting, whereby mold charges of predetermined size and shape may be produced.

2. A machine for separating formed charges of viscous glass from viscous mass, comprising a receptacle for viscous glass having a delivery aperture in its base; means for controlling delivery of the glass comprising a device for intermittently covering and completely uncovering and leaving the aperture entirely unthrottled when uncovered, severing means independent of said last means, and means for varying either the duration of the period of uncovering or the frequency of severing independently of each other, whereby mold charges of predetermined size and shape may be produced.

3. A machine for separating formed charges of viscous glass from viscous mass comprising a receptacle for viscous glass with a delivery aperture of chosen dimensions in its base; means for controlling delivery of the glass comprising a device for stopping extrusion from the aperture with a static pressure flame and then completely uncovering and leaving the aperture entirely unthrottled when uncovered, severing means independent of said last means, and means for varying either the period of uncovering or the frequency of severing independently of each other.

4. A machine for separating formed charges of viscous glass from viscous mass, comprising a receptacle for viscous glass having a delivery aperture in its base, means for intermittently uncovering said aperture completely, severing en bloc glass extruding from said aperture, and closing such aperture in continuous succession, and means for changing the duration of the period of uncovering without varying the frequency of cutting and during the operation of the machine.

5. Glass apparatus comprising a receptacle for molten glass with a feed outlet uncontrolled during feeding, means for successively severing the glass fed, and means for regulatably controlling the length of the feed period between severing operations while the apparatus is in operation without varying the frequency of cutting.

6. In the glass working art, the method of obtaining a succession of mold charges in lump form which comprises superimposing a mass of viscous glass upon an aperture of chosen dimensions, completely uncovering said aperture intermittently and permitting the glass to extrude, severing the glass extruded at each uncovering action, then covering after each severing operation, and varying the period of uncovering or the period between severing actions independently.

7. In the glass working art, the method of obtaining a succession of mold charges in lump form which comprises superimposing a mass of viscous glass upon an aperture of chosen dimensions, completely uncovering said aperture intermittently and permitting the glass to extrude, severing the glass extruded at each uncovering action, then covering after each severing operation, and varying the period of uncovering without varying the interval between cuttings to regulate the charges delivered without varying the rate of production.

8. In the glass working art, the method of obtaining a succession of mold charges in lump form which comprises superimposing a mass of viscous glass upon an aperture of chosen dimensions, completely uncovering said aperture intermittently and permitting the glass to extrude, severing the glass extruded at each uncovering action, then covering after each severing operation, and varying the interval between cuttings without varying the period of uncovering to regulate the rate of production without varying the charges.

9. In the glass working art, the method of obtaining a succession of mold charges in lump form which comprises superimposing a mass of viscous glass upon an aperture of chosen dimensions, completely uncovering said aperture intermittently and permitting the glass to extrude, severing the glass extruded at each uncovering action, then covering after each severing operation, and varying both the period of uncovering and the period between cutting actions in different degrees.

10. In the glass working art, the method of obtaining a succession of mold charges preformed in space from a mass of viscous glass, which method comprises selecting an orifice of predetermined size through which the charges are extruded, intermittently covering and uncovering the orifice at the outlet end thereof to permit glass to extrude without throttling, cutting off each extrusion and stopping further extrusion when a charge of predetermined form, size, and weight has extruded, and variably controlling either the period of extrusion or the frequency of cutting or both.

11. Glass apparatus comprising a receptacle for viscous glass with a delivery aperture of chosen dimensions in its base, in combination with means for intermittently delivering and severing measured portions of said mass, said means comprising devices for completely uncovering such aperture, severing the delivered glass and closing the aperture, in continuous succession, and means for varying the period of uncovering without varying the frequency of cutting, whereby the measurements of the charges are finally determined by the period of feed while the rate of production and the area of the passage through which the glass is delivered remain unchanged.

12. Glass apparatus comprising a receptacle for viscous glass with a delivery aperture in its base, means for successively severing immediately beneath said aperture the glass extruded through the aperture, means for stopping from below extrusion of glass through said aperture after each severing operation and operable to permit free extrusion before the next severing operation, and means for measuring the quantity of glass extruded by adjusting or maintaining the periods of stoppage and extrusion independently of the adjustment or maintenance of the frequency of severing.

13. Glass apparatus comprising a receptacle for molten glass with a feed outlet in its base, automatic means for completely covering and completely uncovering said outlet in continuous succession to permit glass to be delivered through the outlet, means for severing the glass delivered at each uncovering, and means for maintaining the same length of the uncovering period upon increase or decrease of the frequency of severing operations.

14. Glass apparatus comprising a receptacle for molten glass with a feed outlet in its base, means for alternately closing said outlet completely and permitting unrestrained emission of glass therefrom in continuous succession, means for severing each emission of glass, and means for varying either the frequency of the severing operations or the period of emission while maintaining the other constant.

15. In a glass apparatus for preforming mold charges in space, comprising a receptacle for molten glass having an unobstructed delivery opening in the bottom wall, stopping means for periodically stopping the emission of glass through the opening, and devices for severing the emitted glass, in combination with adjustable control mechanism for adjustably controlling the starting of emission while maintaining the period between severing operations constant.

16. In a glass apparatus for preforming mold charges in space, comprising a receptacle for molten glass having an unobstructed delivery opening in the bottom wall, stopping means for periodically stopping the emission of glass through the opening, and devices for severing the emitted glass, in combination with adjustable control mechanism for the stopping means adapted for adjustment while the machine is operating.

17. In a glass apparatus for preforming mold charges in space, comprising a receptacle for molten glass having an unobstructed delivery opening in the bottom wall, stopping means for periodically stopping the emission of glass through the opening, and devices for severing the emitted glass, in combination with adjustable control mechanism for variably controlling the devices for severing while maintaining the period between extrusions constant.

18. In a glass apparatus for preforming mold charges in space, comprising a receptacle for molten glass having an unobstructed delivery opening in the bottom wall, stopping means for periodically stopping the emission of glass through the opening, and devices for severing the emitted glass, in combination with adjustable control mechanism for variably controlling the starting of emissions, independently of the severing operations to maintain uniform charges while varying the rate of production.

19. In a glass apparatus for preforming mold charges in space, comprising a receptacle for molten glass having an unobstructed delivery opening in the bottom wall, stopping means for periodically stopping the emission of glass through the opening, and devices for severing the emitted glass, in combination with adjustable control mechanism for adjustably controlling the starting of emission while maintaining the period between severing operations constant, and means whereby said adjustment may be effected while the machine is in operation.

20. In a glass apparatus for preforming mold charges in space, comprising a receptacle for molten glass having an unobstructed delivery opening in the bottom wall, stopping means for periodically stopping the emission of glass through the opening, and devices for severing the emitted glass, in combination with adjustable control mechanism for variably controlling the starting of emissions, independently of the severing operations to maintain uniform charges while varying the rate of production, and means whereby said adjustment may be effected while the machine is in operation.

21. Glass apparatus comprising a receptacle for molten glass with a feed outlet uncontrolled during feeding, means for successively severing the glass fed, and means for maintaining the same length of the feed period upon increase or decrease of the frequency of cutting operations.

22. Glass apparatus comprising a receptacle for molten glass with a feed outlet uncontrolled during feeding, means for successively severing the glass fed, and means for varying the length of the feed period without varying the frequency of severing operations.

23. Glass apparatus comprising a molten glass receptacle with a feed outlet uncontrolled during feeding, means for successively severing the glass fed and closing the outlet after each severing action, and means for varying the period such outlet remains closed without varying the instant of severance.

24. Glass apparatus comprising a receptacle for molten glass with a feed outlet uncontrolled during feeding, means for successively severing the glass and closing the outlet after each severing action, and means for varying the frequency of severance without varying the period of opening of the outlet.

25. Glass apparatus comprising a receptacle for molten glass with a feed outlet uncontrolled during feeding, means for successively severing the glass and closing the outlet after each severing action, and means for varying the frequency of severance without varying the period of closing.

26. Glass apparatus comprising a molten glass receptacle with a delivery aperture therein, means for successively severing quantities of glass fed through such aperture and checking the feed in between cutting actions for a regulable length of time, and means effective while the machine is in motion, for regulating the time such checking action is effective.

27. The combination with a receptacle containing molten glass, and having a delivery opening, of means for measuring and severing adapted to alternately support the glass in the opening and to uncover the opening and permit the passage therethrough of a quantity of glass for the next severing action, and means for controlling the period of uncovering and thus measuring the glass fed for each cutting action.

28. Glass apparatus comprising a receptacle for molten glass with a feed outlet uncontrolled during feeding, and means for successively severing the glass fed and for controlling the period of feed, such means being adjustable to independently vary either the feed period or the frequency of cutting.

29. Glass apparatus comprising a receptacle for molten glass with a feed outlet uncontrolled during feeding, and means for successively severing the glass fed and for controlling the period of feed, such means being regulable to vary the frequency of the cutting operations and variable to compensate for such variation in frequency and maintain feed of the same quantity.

30. In glass working apparatus, glass feeding means comprising a container having a discharge outlet in its base, a means movable below the outlet to and from position to direct a blast of pressure fluid against the glass issuing from the outlet, severing means operating alternately with said blast-applying means for severing mold charges from the issued glass before the issued glass contacts with any solid undersupport, a piston carrying said blast-applying means, a cylinder in which said piston may reciprocate, a control valve for said cylinder to control admission of air to the cylinder for effecting controllable movement of the piston in either of opposite directions, and a timing device for said control valve.

31. In glass working apparatus, a glass container having a submerged outlet in its base, a means movable below the container in the line of movement of glass issuing through said outlet for applying a blast of pressure fluid against the issuing glass, a piston carrying said blast-applying means, a cylinder for raising and lowering said piston, a control valve for said cylinder to control the admission of air to said cylinder to effect controllable movement of the piston in either direction, shears for severing mold charges from the issued glass before the same contacts with any solid undersupport, means for operating said shears, a second control valve for said shear operating means, and means for timing the movements of said control valves in respect to each other.

32. In glass working apparatus, a molten glass container having a discharge outlet through which glass may issue downwardly, a means movable below the outlet in the direction and line of flow of the issuing glass for causing a supporting effect on said issuing glass, means for moving said support-effecting means, and means for regulating the speed of movement of said support-effecting means.

33. In glass working apparatus, a molten glass container having a discharge outlet through which glass may issue downwardly, a means movable below the outlet in the direction and line of flow of the issuing glass for causing a supporting effect on said issuing glass, means for moving said support-effecting means, and means for severing a mold charge from the issued glass while the latter hangs freely from the outlet.

34. In glass working apparatus, a molten glass container having a discharge outlet through which glass may issue downwardly, a means movable below the outlet in the direction and line of flow of the issuing glass for causing a supporting effect on said issuing glass, means for moving said support-effecting means, means for severing a mold charge from the issued glass while the latter hangs freely, and means for variably timing the commencement of movement of said support-effecting means.

35. The method of controlling the delivery of glass from a spout orifice which comprises applying an enclosed combustion to the glass and thereby forcing the glass back in said orifice.

36. The method of stopping delivery of glass from an orifice after cutting, which comprises applying an enclosed combustion to glass within the delivery orifice.

37. The method of stopping delivery of glass from an orifice after cutting, which comprises capping the delivery orifice with a cup into which an explosive mixture is fed and burned under pressure, and varying the pressure while the orifice is capped.

38. The method of stopping delivery of glass from an orifice after cutting, which comprises capping the delivery orifice with a cup into which an explosive mixture is fed and burned under pressure.

39. The method of stopping delivery of glass from an orifice after cutting, which comprises capping said orifice with a cup in which a fluid under pressure is maintained, and permitting a constant escape of a porton of said fluid from said cup to maintain a sufficient pressure against the glass.

40. Glass delivery apparatus comprising a means provided with a delivery orifice, and means for applying an enclosed combustion of fluid burning under pressure to the delivery orifice and the glass therein.

41. Glass delivering apparatus comprising a means provided with a delivery orifice, and means for capping said orifice with a cup, means for introducing an explosive mixture thereinto and burning such explosive mixture therein under pressure, and means for varying such pressure.

42. Glass delivering apparatus comprising a means provided with a delivery orifice, means for capping said orifice with a cup, means for introducing a fluid under pressure into said cup, and means permitting the exit of a portion of such fluid from said cup.

43. The method of treating glass from which a charge has been severed, which comprises applying a cup enclosing a heating fluid to the glass with the temperature of the heating fluid hotter than the portion of the glass from which the charge has been severed.

44. The method of treating glass, which comprises issuing a charge from a delivery orifice, severing the charge, and applying a cup enclosing a heating fluid to the glass with the temperature of the heatng fluid hotter than the portion of the glass from which the charge has been severed.

45. The method of treating glass from which a charge has been severed, which comprises applying a movable cup enclosing a heating fluid to the glass with the temperature of the heating fluid hotter than the portion of the glass from which the charge has been severed.

46. The method of treating glass from which a charge has been severed, which comprises applying a cup enclosing a heating fluid under pressure to the glass with the temperature of the heating fluid hotter than the portion of the glass from which the charge has been severed.

47. The method of delivering viscous glass, which comprises superimposing a mass of such glass above a delivery orifice, successively extruding and severing portions of such glass and after each severing action covering the orifice and the glass therein with a pressure container wherein gases burn under pressure.

48. The method of separating molten glass from mass, which comprises disposing a mass of molten glass in a receptacle with an aperture, passing a portion of glass through such aperture, severing, and applying a combustion chamber to said aperture, said chamber being fed with a combustible mixture.

49. The method of stopping the passage of molten glass through an aperture, which comprises applying an enclosed combustion of air and gas under pressure thereto.

50. The method of separating molten glass from mass, which comprises disposing a mass of molten glass in a receptacle with an aperture, passing a portion of the glass through such aperture and retarding gravitation by an enclosed combustion.

51. The method of feeding glass in mold charges delivered en masse to receptacles, comprising discharging glass suitable for suspended charge feeding downwardly and suspending it in successive masses from the bottom of a container, severing a mold charge from each mass before the lower end thereof comes into contact with any solid undersupport, and intermittently applying heat to the glass to reheat the stub left after each severing operation.

52. The method of feeding glass in mold charges delivered en masse to receptacles, comprising discharging glass downwardly and suspending it in successive masses from the bottom of a container, severing a mold charge from each mass before the lower end of the mass contacts with any physical undersupport, removing the severing means after each severing operation, and temporarily confining gases in combustion and under pressure about the stub left after each severing operation.

53. The method of feeding glass in mold charges delivered en masse to receptacles, comprising discharging glass downwardly and suspending it in successive masses from the bottom of a container, severing a mold charge from each mass before the lower end of the mass contacts with any physical undersupport, removing the severing means after each severing operation, confining gases in combustion and under pressure about the stub left after each severing operation, and removing the combustion confining means from the path of downward movement of the suspended glass before the succeeding severing operation.

54. The method of feeding glass in mold charges delivered en masse to receptacles, comprising discharging glass suitable for suspended charge feeding downwardly and suspending it in successive masses from the bottom of a container, severing a mold charge from each mass before the lower end of the mass contacts with any solid undersupport, removing the severing means after each severing operation, and applying a heating blast to the stub left after each severing operation to retard the downward movement of the suspended mass of glass and to obviate chill marks on the mold charge that may be subsequently severed therefrom.

55. The method of feeding molten glass from a submerged outlet in the base of a container, which comprises establishing a gravity flow of glass through said outlet, suspending the issuing glass from the outlet without physical undersupport, and periodically applying an enclosed combustion of air and gas under pressure to the issuing glass.

56. A machine for getting charges of viscous glass, comprising a spout having a delivery orifice and so connected to a glass furnace that such orifice will always be covered with glass and so constructed that it will extrude a column of glass unless such glass is checked from below, means for periodically severing the end from each column as it is extruding, and means for enclosing the end which remains after each column is severed with a combustion cup fed with gas burning therein under pressure.

57. A machine for getting charges of viscous glass, comprising a spout having a delivery orifice and so connected to a glass furnace that such orifice will always be covered with glass and so constructed that it will extrude a column of glass unless the glass is checked from below, means for periodically severing the end from each column as it is extruded, means for enclosing the end which remains after each column is severed with a combustion cup fed with gas burning therein under pressure, and means for varying the pressure in said cup.

58. A machine for getting charges of viscous glass, comprising a spout having a delivery orifice and so connected to a glass furnace that such orifice will always be covered with glass, said spout being so constructed that it will extrude a column of glass unless the glass is checked from below, means for periodically severing each column as it extrudes, a combustion cup for capping said orifice from below in between severing operations, said cup being fed with a gaseous mixture burning under pressure, and means for varying the effective position of said cup.

59. In a machine for getting charges of viscous glass, comprising a spout having a delivery orifice and so connected to a glass furnace that such orifice will always be so constructed that it will extrude a column of glass unless the glass is checked, means for periodically severing the end of each column as it extrudes, a combustion cup operative to automatically cap such spout orifice from below after each severing operation, said cup being fed with a gaseous mixture burning therein under pressure when said cup is in capping position.

60. The method of feeding molten glass into mold charges, which comprises passing glass downwardly through the outlet of a glass container and suspending the issued glass in successive masses beneath the outlet, periodically severing mold charges from said suspended masses, and forcing the glass stub left after each severing operation back into the outlet a predetermined regulable extent by an enclosed combustion of air and combustible fuel under pressure applied from below to the glass at the orifice.

61. The method of feeding molten glass in mold charges, which comprises passing glass downwardly through an outlet in the base of a container, suspending the issued glass in successive masses beneath the outlet, periodically severing mold charges from the suspended masses, and enclosing the glass stub left after each severing operation by a fluid under pressure and having a temperature higher than that of the glass stub.

62. The method of feeding molten glass in mold charges, which comprises periodically discharging glass downwardly through an outlet in the base of a glass container, suspending the issued glass in successive masses beneath the outlet, periodically severing mold charges from the suspended masses and applying an upwardly directed enclosed combustion to the glass stubs left after the respective severing operations, and varying the effective action of said enclosed combustion on a glass stub when desired to vary the shape and size of the next succeeding mold charge.

63. The method of controlling the shape of mold charges severed periodically from successive masses suspended beneath the outlet of a glass container, which comprises capping the outlet after each severing operation by a cup containing a burning mixture of air and combustible fluid under pressure for forcing the glass back into the orifice, and varying the intensity of the flame in the cup to vary the shape and size of the next succeeding mold charge.

64. The method of feeding molten glass in mold charges adapted to be delivered en masse to receptacles, comprising flowing glass downwardly through an orifice and suspending the issued glass in successive masses beneath the outlet, enclosing the glass stub left after each severing action in an enclosed flame under pressure, and regulating the duration of the application of the flame on the glass stub and the position of the flame during its action on the glass stub to retard or reverse normal downward movement of the issuing glass to vary the shape and size of the succeeding mold charge as desired.

65. The combination with a container for molten glass, having an outlet in its base through which the glass issues, of a cup movable into and out of position beneath said outlet, and means to supply a heating flame within the cup when in position beneath the orifice of sufficient pressure to force the glass back in the outlet.

66. The method of controlling flow of molten glass through an orifice, which comprises applying an enclosed combustion under pressure to the glass within the orifice.

67. Glass-working apparatus comprising a glass container having a discharge orifice, and means for applying an enclosed combustion to the glass within the orifice.

68. Glass gathering apparatus comprising means for delivering a combustible mixture to a point for influencing the movement of the molten glass, and an automatic control for the composition of the combustible mixture.

69. Glass gathering apparatus comprising means for delivering a combustible mixture to a point for influencing the movement of the molten glass, and an automatic control for the quantity of gas forming a part of such mixture.

70. Glass gathering apparatus comprising means for delivering a combustible mixture to a point for influencing the movement of the molten glass, and an injector forming a part of said delivery means.

71. Glass gathering apparatus comprising means for delivering a combustible mixture to a point for influencing the movement of the molten glass, comprising a combustion cup and injector.

72. Glass gathering apparatus comprising an injector for mixing gas and air, and an automatic means for regulating the vacuum which draws air into the mixture.

73. Glass gathering apparatus comprising a combustion cup, and means for delivering a combustible mixture thereto under pressure.

74. Glass gathering apparatus comprising a combustion cup, means for forcing air thereinto under pressure and sucking gas in with the air, and automatic means for regulating the quantity of gas drawn and making it uniform under all probable conditions.

75. Apparatus for gathering glass comprising a combustion cup subject to variable degrees of closure; and means for insuring the feeding of a uniform combustible mixture throughout all degrees of closure.

76. An injector for delivering a mixture of air and gas, and means for automatically regulating the vacuum which draws in the gas.

77. An injector for delivering a mixture of air and gas, and an automatically acting checking valve which limits the vacuum and therefore the gas drawn into the mixture.

78. Glass gathering apparatus comprising a combustion cup movable between operative and inoperative positions, means for feeding a combustible mixture into said cup and burning under pressure therein, said last means being automatically rendered effective when said cup starts to move towards operating position.

79. In combination with glass feeding apparatus having a plurality of movable units, of means for delivering a combustible mixture for influencing the movement of the molten glass, said means being operable to control the supply of said combustible mixture in timed relation to the operation of said units.

80. A machine for getting charges of viscous glass comprising a spout having a delivery orifice and so connected to a glass furnace that such orifice will always be covered with glass, said spout being so constructed that it will extrude a column of glass unless the glass is checked from below, means for perdiodically severing the end of each column as it extrudes, a combustion cup operative to automatically cap such spout orifice from below after each severing operation, said cup being fed with a gaseous mixture under pressure, and means to automatically maintain a uniform combustion in said cup as the outlet therefrom varies in size.

81. In a machine for getting charges of viscous glass comprising a spout having a delivery orifice and so connected to a glass furnace that such orifice will always be so constructed that it will extrude a column of glass unless the glass is checked, means for periodically severing the end of each column as it extrudes, a combustion cup operative to automatically cap such spout orifice from below after each severing operation, said cup being fed with a gaseous mixture, and means for maintaining combustion in said cup as the outlet therefrom decreases.

82. In a machine for getting charges of viscous glass comprising a spout having a delivery orifice and so connected to a glass furnace that such orifice will always be so constructed that it will extrude a column of glass unless the glass is checked, means for periodically severing the end of each column as it extrudes, a combustion cup operative to automatically cap such spout orifice from below after each severing operation, said cup being fed with a gaseous mixture under pressure, and means for maintaining a substantially uniform ration between the gas and air in said cup as the outlet from said cup decreases.

83. The method of forming a succession of mold charges of definite shape, dimensions and weight which comprises superimposing a mass of viscous glass upon an aperture of chosen dimensions, operating shears at regular intervals below the aperture in position to sever charges of glass from successive columns of glass extruded through said aperture, extruding successive columns of glass through said aperture and past the severing plane, checking each stub of glass by an underneath supporting element after a charge has been severed therefrom for a preselected portion of the interval between successive severing operations to regulate the period of extrusion and by such element regulably positioning the stub for the starting of the glass feeding period, whereby the lengths of the charges are determined by the starting position of the stub and the period of feed, and severing each charge while it retains the shape imposed upon it by the extrusive action and the checking and positioning action.

84. The method of forming a mold charge of molten glass, which comprises flowing glass downwardly through an outlet, temporarily and movably supporting the issuing glass by a gaseous undersupport, moving said undersupport downward in the line of movement of the issuing glass at a speed less than the normal rate of downward movement of the issuing glass, removing said undersupport, and severing a mold charge from the issued glass.

85. The method of forming a mold charge of molten glass, which comprises flowing glass downwardly through an outlet, directing a downwardly receding upwardly directed blast of pressure fluid against the issuing glass to retard the downward movement of the latter, and severing a mold charge from said issued glass while it hangs freely.

86. The method of forming a mold charge of molten glass, which comprises flowing glass downwardly through an outlet, temporarily enclosing a fluid hotter than the issued glass with the lower end of the issued glass sufficiently to build up a pressure against the latter for retarding the downward movement of the issued glass, moving said pressure causing means in a downward direction at a speed less than that of the normal downward movement of the issued glass, and severing a mold charge from the issued glass.

87. The method of forming a mold charge of molten glass, which comprises flowing glass downwardly through an outlet, temporarily applying a downwardly receding upwardly directed combustion of air and gas burning under pressure to the lower portion of the issued glass, and severing a mold charge from said issued glass.

88. The method of forming a mold charge of molten glass, which comprises flowing glass downwardly through an outlet, temporarily retarding the downward movement of the issued glass by a downwardly receding upwardly directed flame, and severing a mold charge from the issued glass.

89. The method of forming a mold charge of molten glass, which comprises flowing glass downwardly through an outlet, applying an upwardly directed blast of heating fluid against the issuing glass, moving the blast applying means downwardly at an initial speed less than the normal speed of downward movement of the issuing glass, then accelerating the speed of downward movement of the blast applying means beyond that of the downward movement of the issuing glass, moving the blast applying means out of the path of movement of the issued glass, and severing a mold charge from the latter.

90. The method of feeding molten glass, which comprises discharging glass downwardly through an aperture in the bottom of a glass container, suspending the discharged glass beneath said aperture without solid undersupport, and periodically opposing the downward movement of the discharged glass by a receding upwardly directed heating blast.

91. The method of forming a mold charge, which comprises flowing glass downwardly through an outlet, bringing a movable pressure fluid support into contact with the issued glass beneath the latter, controlling the rate of downward movement of the issued glass by moving said pressure fluid support downwardly while in supporting relation to the issued glass, then moving said pressure fluid support laterally of the path of downward movement of the issued glass, and severing a mold charge from said issued glass.

92. In glass-working apparatus, a glass container having an outlet in its base, a means movable in the direction and line of flow of the glass issuing from said outlet for applying to the issuing glass a fluid having a temperature higher than that of the issuing glass, and means for moving said fluid-applying means in said direction in advance of the issued glass and in position to apply said fluid to the glass.

93. In glass-working apparatus, a glass container having an outlet in its base through which glass may issue, a means movable in the direction and line of movement of the issuing glass for subjecting the issuing glass to an upwardly directed combustion of air and gas burning under pressure, and means for moving said combustion-applying means.

94. In glass-working apparatus, a glass container having an outlet in its base through which glass may issue, a means movable in the direction and line of movement of the issuing glass for applying a gaseous support to the latter, and a fluid pressure operated means for moving said supporting means.

95. In glass-working apparatus, a glass container having an outlet in its base through which glass may issue, a means for applying an upwardly directed blast of pressure fluid, means for supporting said blast applying means for horizontal movement to and from a position in line with the outlet and for vertical movement in line with said outlet, and fluid pressure operated means cooperable with said supporting means for moving said blast-applying means.

96. In glass-working apparatus, a glass container having an outlet in its base through which glass may issue, a means movable horizontally into and out of a position in line with said outlet and beneath the outlet for causing an upwardly directed heating blast, fluid pressure operated means for effecting said horizontal movement of the blast-causing means, other fluid pressure operated means for causing vertical movement of said blast-causing means in line with said outlet, and means for regulating said last named fluid pressure operated means to vary the rate of vertical movement of the blast-causing means away from said outlet.

97. The method of feeding molten glass, which comprises causing glass to issue downwardly through an outlet in the base of a glass container, regulating the rate of flow of the issuing glass during the accumulation of a mass of glass sufficient to form a mold charge below the outlet by the application to the end of the issuing glass of a receding fluid pressure undersupport, whereby the shape of the issuing glass is controlled, removing the undersupport, and severing a mold charge from the glass before the same contacts with any receptacle.

In testimony whereof we hereby affix our signatures.

OLIVER M. TUCKER.
WILLIAM A. REEVES.